United States Patent [19]
Mechling et al.

[11] Patent Number: 5,873,030
[45] Date of Patent: Feb. 16, 1999

[54] METHOD AND SYSTEM FOR NATIONWIDE MOBILE TELECOMMUNICATIONS BILLING

[75] Inventors: Stephen W. Mechling; William A. Sims, both of Colorado Springs, Colo.; Thelma Pimental, Plano, Tex.; Phillip Wayne Fought, Chevy Chase, Md.

[73] Assignee: MCI Communications Corporation, Washington, D.C.

[21] Appl. No.: 673,418

[22] Filed: Jun. 28, 1996

[51] Int. Cl.$^6$ ....................................................... H04Q 7/00
[52] U.S. Cl. ............................................ 455/408; 379/114
[58] Field of Search .................................... 455/406, 407, 455/408, 410, 411, 507, 517; 705/34; 379/111–115, 133, 134, 145

[56] References Cited

U.S. PATENT DOCUMENTS

| | | |
|---|---|---|
| 5,223,699 | 6/1993 | Flynn et al. ........................ 379/144 X |
| 5,325,290 | 6/1994 | Cauffman et al. ................... 379/112 X |
| 5,661,792 | 8/1997 | Akinpelu et al. ........................ 379/221 |
| 5,680,611 | 10/1997 | Rail et al. ............................ 370/259 X |

*Primary Examiner*—Thomas J. Mullen, Jr.

[57] ABSTRACT

The method any system for nationwide mobile telecommunications billing provides improved efficiency in billing for mobile services. Local mobile networks are communicatively connected by signaling network to a national mobile service platform (MNSP). Traffic event information generated by local mobile networks is collected directly by the NMSP. Traffic event information generated by local landline networks and long distance networks is also collected by the NMSP. The NMSP processes all traffic events for all calls, generates all necessary billing information and returns resulting billing information to other networks only when necessary. In order to simplify NMSP processing, all billing information collected from other networks is formatted to form uniform master call detail records (MCDR). Each MCDR contains all the information necessary for the NMSP to perform its processing. Each MCDR is rated, then billing information is generated.

32 Claims, 15 Drawing Sheets

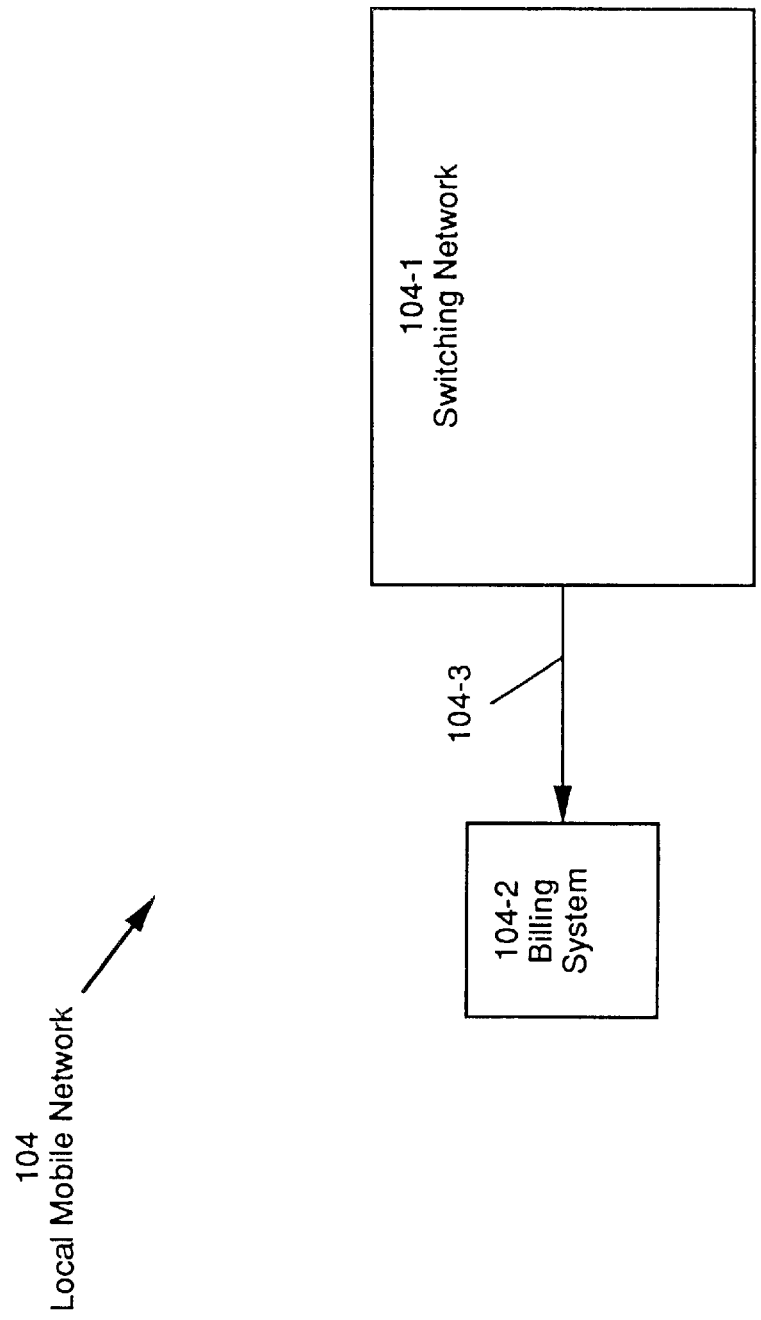

METHOD AND SYSTEM FOR NATIONWIDE MOBILE TELECOMMUNICATIONS BILLING

BACKGROUND OF THE INVENTION

1. Field Of The Invention

The invention relates generally to billing in telecommunications networks, and in particular to a system and method for improving efficiency in billing for mobile telecommunications services.

2. Background Information

A multitude of mobile communications systems have been established throughout the world. These systems include older systems, such as, for example, Nordic Mobile Telephone (NMT), Advanced Mobile Phone System (AMPS), Total Access Communications System (TACS) as well as newer digital systems, for example, Global System for Mobile communications (GSM) and Personal Communications System (PCS). While these systems differ in many details, they are similar in many respects. In particular, all mobile systems have similar problems associated with inter-system billing. In order to simplify the description of the present invention, the present invention is described in the context of the GSM. However, the GSM is used merely as an example of a mobile communications system. The principles of the present invention are not limited to GSM; they are equally applicable to other mobile telecommunications systems as well.

In 1982, the global system for mobile communications (GSM) was established in Europe, to provide a cellular mobile radio system. The primary function of the GSM is to provide a full roaming mobile telephone service. The GSM protocol has been selected for use around the world for digital mobile telephone service. The principles of operation of the existing GSM digital mobile telephone system is described in the following references:

Balston, D. M., "Pan-European Cellular Radio", IEEE Electrical and Communications Journal, No. 1, pp. 7–13, 1989.

Goodman, D. J., "Second Generation Wireless Information Networks", IEEE Transactions on Vehicular Technology, VT-40, May 1991, pp. 366–374.

Pautet, M. B., and Mouly, M., "GSM Protocol Architecture: Radio Subsystem Signaling", IEEE Vehicular Technology Conference, May 1991, pp. 326–332.

A problem arises when calls involving roaming mobile subscribers must be billed. Whenever a call involving a roaming subscriber is completed, billing records for that call must be sent to the subscriber's home system in order for the subscriber to be billed. Although the GSM specifications specify the information which must be included in a billing record, they do not specify a particular format which must be used. Consequently, in Europe, a situation has arisen in which each GSM system uses a different format for its billing records. Each billing record received must be reformatted to the format used by the system receiving the record. Because there are a plurality of systems, each with its own format, each system must be capable of reformatting messages received in a plurality of formats. This places an overhead burden on each system's billing processing systems.

The billing records are used not only to generate subscriber bills, but to facilitate reconciliation between telecommunications carriers. Each call originated within a particular carrier's mobile system entitles the carrier to receive at least a portion of the amount which is billed to the subscriber. Periodically, all carriers must reconcile the amounts they are due from other carriers and the amount payable to other carriers. If the amounts due from and payable to another carrier are not equal, one carrier must pay the other the difference. Billing records are used to generate reconciliation information. Multiple formats for billing records causes an overhead burden on this process also.

This problem may be even worse in the United States, in which there are even more independent PCS systems. Many PCS systems have adopted the GSM standard. If each PCS system adopted a different format for its billing records, as is the case in Europe, the overhead burden would be even greater. This problem is shown by the example of a call placed from a mobile station located in one mobile network to a mobile station located in another mobile network. Typically, such a call would be handled by an originating mobile network, a local land-line network, a long distance network, a remote land-line network and a destination mobile network. Five telecommunications networks are involved. The call causes each network to generate traffic information about the call. Each network must then process their respective traffic information and separately generate billing information for its portion of the call. Much of this information must be communicated to some other network in order for proper billing and reconciliation to be completed. Each network which sends billing information may send the information in a different format. Each network which receives billing information must reformat the received information in order to process the information. With a large number of possible formats, the overhead burden of reformatting each record may become excessive. A need exists to reduce the amount of reformatting of call detail records which must be performed for wireless calls.

SUMMARY OF THE INVENTION

An object of the present invention is to improve the efficiency of communication of billing information for mobile telecommunications.

Another object is to reduce the amount of reformatting of billing information which must be performed by telecommunications networks for mobile telecommunications.

Another object is to reduce the overhead burden of generating customer bills and reconciliation information which must be performed by telecommunications networks for mobile communications.

These and other objects, advantages and features are provided by the method and system for nationwide mobile telecommunications billing. In one embodiment, every local mobile network generates billing information in the same format, known as a master call detail record (MCDR). A base set of fields is populated with information generated by every mobile transaction. Extension fields are populated only when necessary, depending upon the information generated by each mobile transaction.

In another embodiment, local mobile networks are communicatively connected by a signaling network to a national mobile service platform (NMSP). Local mobile networks associated with the NMSP generate MCDRs and communicate them to the NMSP for processing. Traffic event information generated by other local mobile networks, local land-line networks and long distance networks is collected by the NMSP. The NMSP processes all traffic events for all calls, generates all necessary billing information and returns resulting billing information to other networks only when necessary.

To simplify NMSP processing, all billing information collected from other networks is formatted to form uniform master call detail records. Each MCDR contains all the information necessary for the NMSP to perform its processing. Each MCDR is rated, then billing information is generated. All billing information returned to associated networks is in MCDR format. Billing information returned to other networks is translated by the NMSP to other formats as appropriate.

BRIEF DESCRIPTION OF THE DRAWINGS

FIG. 3b is a flow diagram of the subprocess of step 302A of FIG. 3a.

FIG. 3c is a flow diagram of the subprocess of step 302B of FIG. 3a.

FIG. 3d is a flow diagram of the subprocess of step 304A of FIG. 3a.

FIG. 3e is a flow diagram of the subprocess of step 306 of FIG. 3a.

FIG. 3f is a flow diagram of billing process 310, implemented in network 100 incorporating an embodiment of the present invention shown in FIG. 2a.

DETAILED DESCRIPTION OF THE INVENTION

Figure 1A:
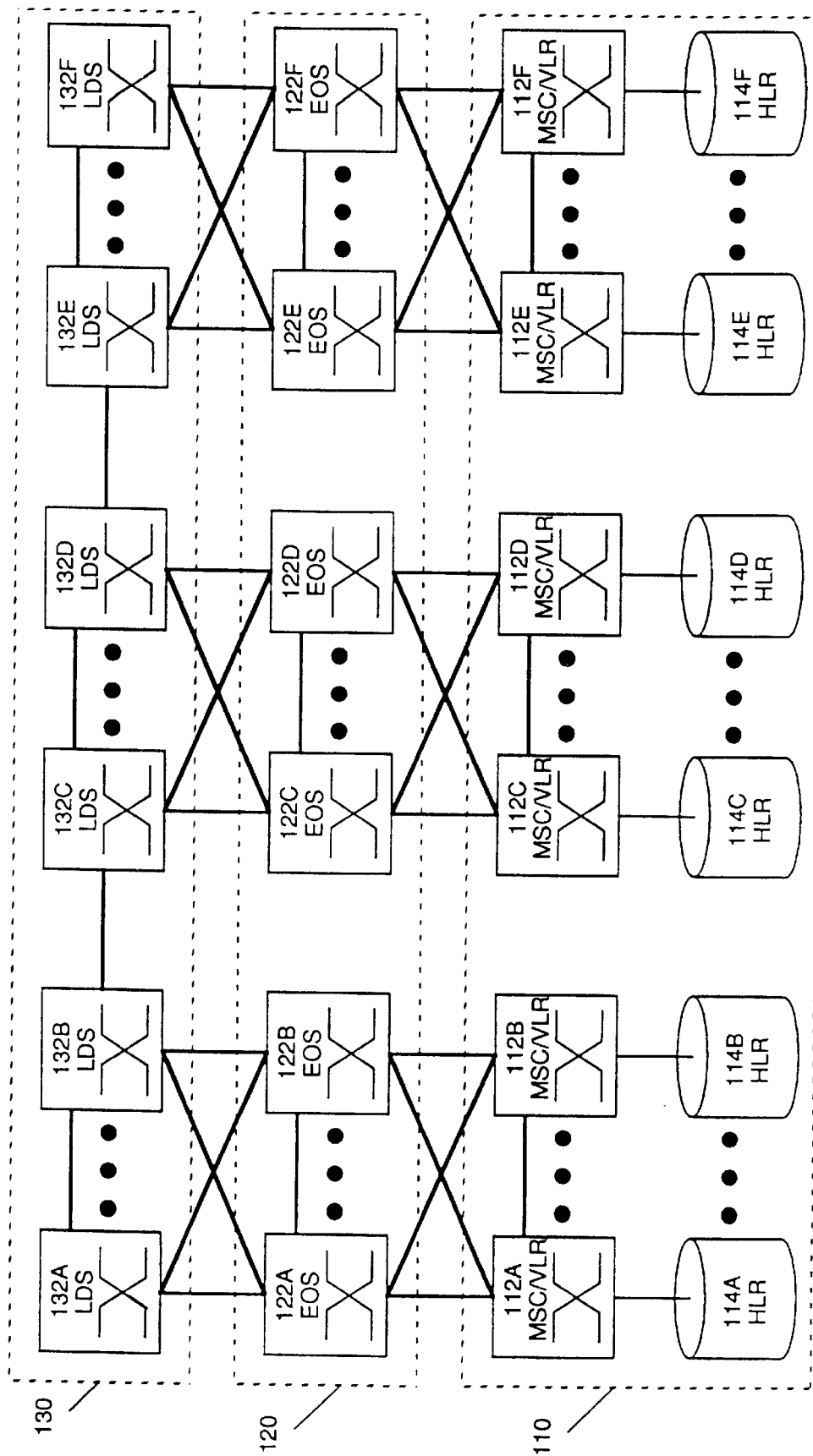
FIG. 1a is a block diagram of an exemplary current nationwide mobile telecommunications network 100.

FIG. 1a is a block diagram illustrating an exemplary nationwide mobile telecommunications network 100. In FIG. 1, there are three tiers 110, 120 and 130 which comprise network 100. The first tier 110 is made up of all the local mobile networks. This includes mobile switching centers with visitor location registers (MSC/VLR) 112A–F, operated by local mobile service providers. Each MSC/VLR 112A–F represents multiple MSC/VLRs operated by the same local service provider. Each MSC/VLR includes two parts. The mobile switching center (MSC) is a switch which routes calls to or from subscriber stations (mobile telephones) and performs call handling functions as well as mobility management functions. The visitor location register (VLR) is a database storing information about each subscriber station visiting or roaming within the MSC service area. This information allows the MSC to process incoming and outgoing calls for each station. Each MSC/VLR communicates with the subscriber stations within each MSC/VLR service area over radio links which, for clarity, are not shown. Each MSC/VLR provides switching facilities for several cells, allowing subscriber mobility between cells. Some MSC/VLRs are connected to other MSC/VLRs, as is shown. This connection allows calls to be routed directly between MSC/VLRs. However, not all MSC/VLRs are interconnected to each other and calls must be routed over other portions of the telecommunications network to the destination MSC/VLRs. Each MSC/VLR or group of MSC/VLRs also includes a home location register (HLR) 114A–F. The HLR contains information about each subscriber station whose home area is assigned to the MSC/VLRs associated with the HLR. This information allows incoming calls to subscriber stations to be correctly routed to each such station.

The second tier 120 is made up of local switches operated by local exchange carrier networks (LEC). These include end-office switches (EOS) 122A–F. Also included, but not shown, are access tandems (AT) which provide long distance carriers with access to more than one EOS within a given local access and transport area (LATA). Each EOS connects to land-line telephones over land-based wiring. An EOS may connect to one or more MSC/VLRs over land based wiring. An EOS may also be directly connected to another EOS, as is shown. End-office switches may also be coupled to each other through ATs, but this is not shown. Each EOS provides switching facilities to route calls between local telephones, local MSC/VLRs and the long distance network represented by the third tier 130.

The third tier 130 is the long distance network which includes long distance switches (LDS) 132A–F. Each LDS is connected to at least one other LDS. The connections shown in FIG. 1 are only an example. In reality, the number of intermediate LDSs between two LDSs may vary considerably. An LDS may also be coupled to EOSs through one or more ATs, but this is not shown. Calls are routed between EOSs over various LDSs, ATs and long distance trunks.

Each network of MSC/VLRs, EOSs and LDSs may be operated by a different service provider. Networks of MSC/VLRs are operated by local mobile networks (LMN), networks of EOSs are operated by local exchange carrier networks (LEC) and LDSs are operated by long distance networks (LDN). Each service provider collects their own traffic information, processes it to create billing information and intercommunicates the billing information with other service provider's networks.

Figure 1B:
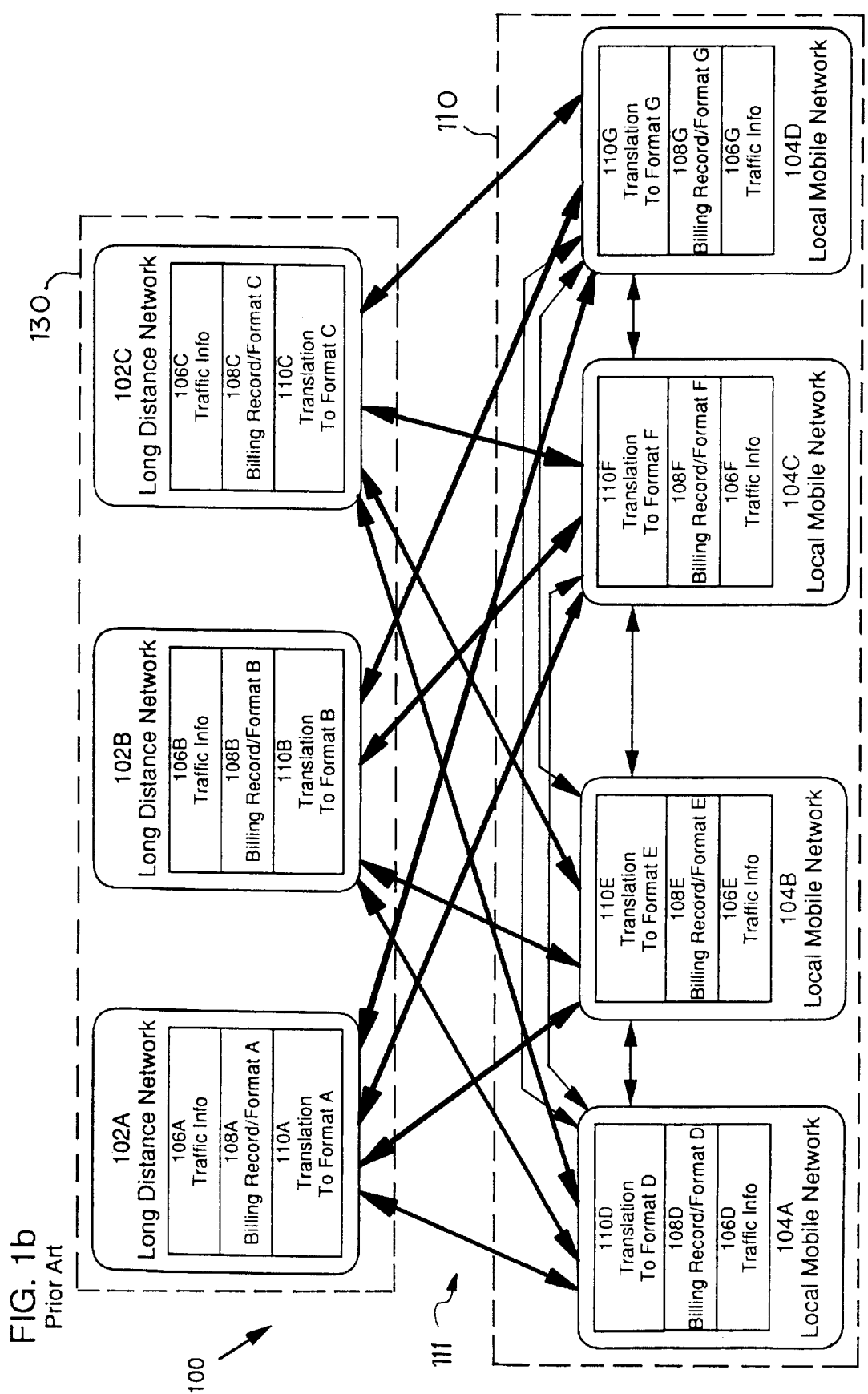
FIG. 1b is a diagrammatic representation of an exemplary flow of billing information which results from network 100.

FIG. 1b is an example of a prior art flow of billing information which occurs in network 100. For clarity, tier 120 has been omitted. Each local mobile network (LMN) 104A–D and long distance network (LDN) 102A–C generates traffic information 106A–G and generates billing records 108A–G from the traffic information. Each LMN and LDN generates billing records in a different format from every other LMN and LDN. Datastreams 111 represent the flow of data between networks over the various communication channels interconnecting the networks. Billing records 108A–G are communicated to the appropriate LMN or LDN as part of datastreams 111. The received billing records are translated by translation process 110A–G from the received format to the format used by the recipient network. Each LMN and LDN then processes the reformatted received billing records and generate invoices which are sent to each network's subscribers.

Since calls may be placed from any LMN to any other LMN, each LMN and LDN must intercommunicate billing records 108A–G with every other network. Therefore, each LMN or LDN receives billing records in the format of every other LMN and LDN. Each received billing record must be translated from the received format to the format used by the recipient network. The result is that each LMN and LDN must be capable of translations from every other billing record format in use. This is a considerable overhead burden on each network.

Figure 2A:
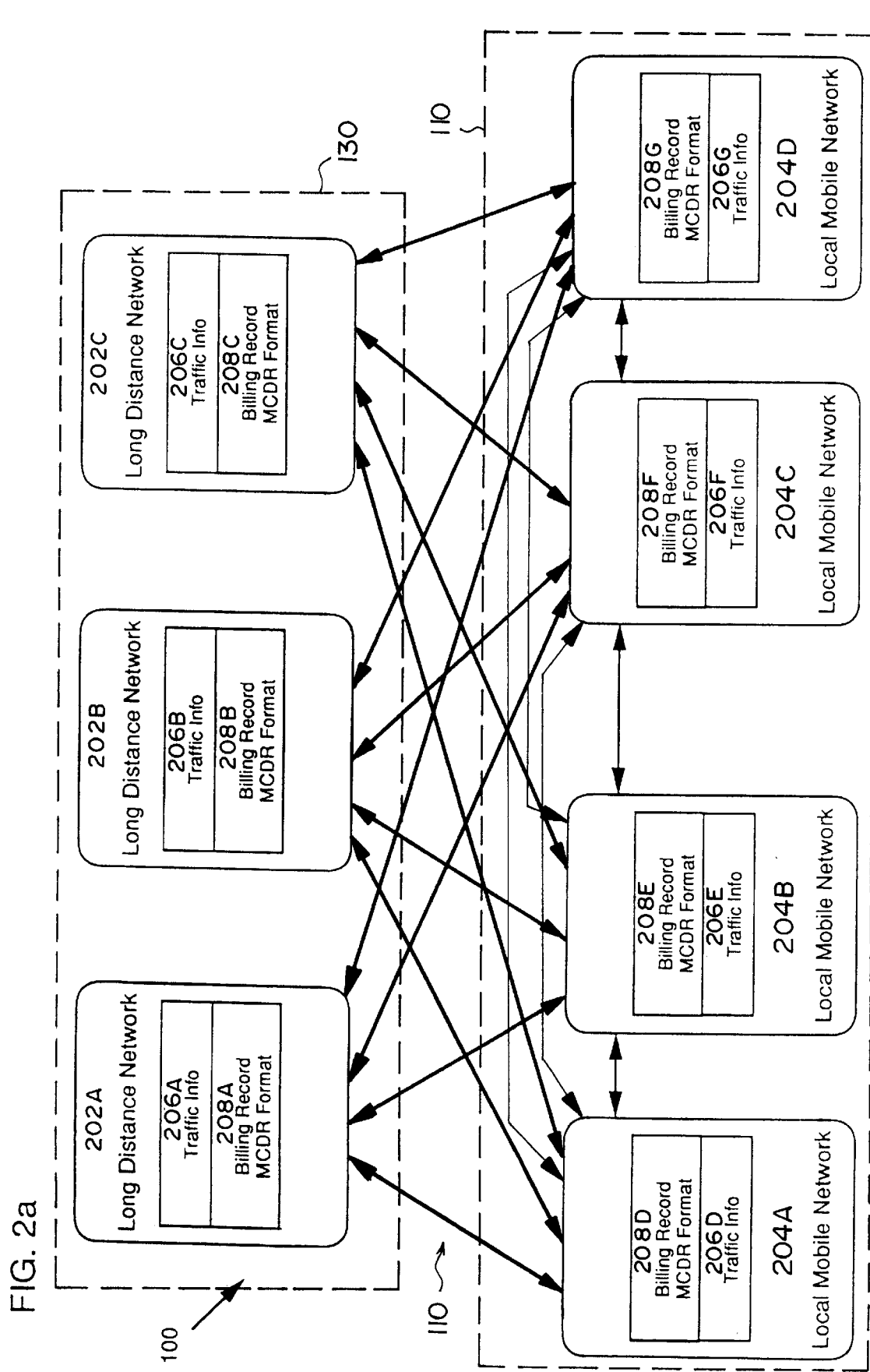
FIG. 2a is a diagrammatic representation of an exemplary flow of billing information which occurs in network 100 incorporating one embodiment of the present invention.

FIG. 2a is an example of a flow of billing information which occurs in network 100, illustrated in FIG. 1a, incorporating one embodiment of the present invention. For clarity tier 120 has been omitted. Each LMN 204A–D and LDN 202A–C generates billing records in a common master call detail record (MCDR) format. Although each LMN and LDN must intercommunicate billing records with every other network as part of datastreams 111, the common format of each billing record eliminates the necessity to translate received records to another format. The elimination of translation eliminates the overhead burden on each network due to translation.

Figure 2B:
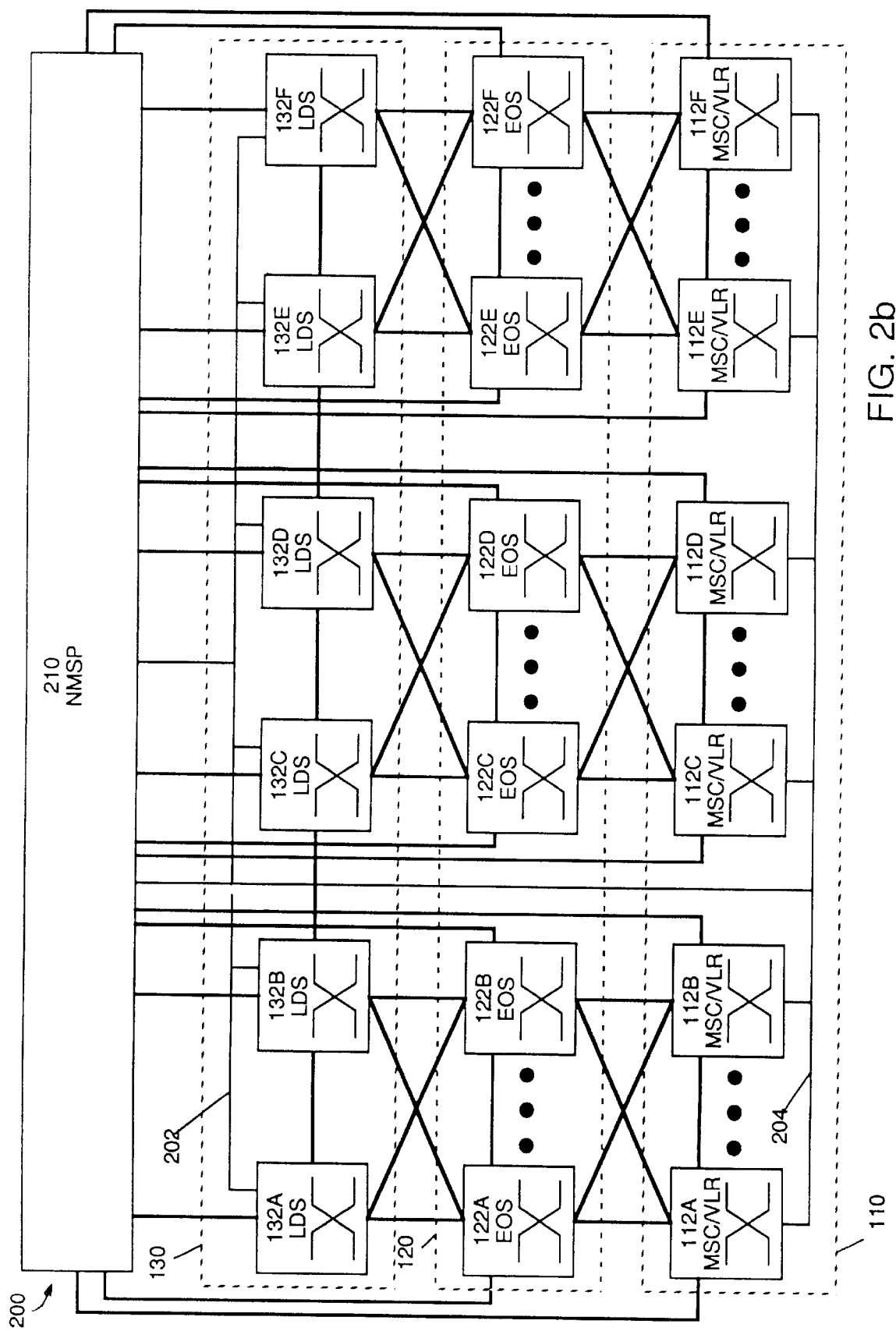
FIG. 2b is a block diagram of an exemplary a nationwide mobile telecommunications network 200, incorporating another embodiment of the present invention.

FIG. 2b is a block diagram of an example of a nationwide mobile telecommunications network 200, in accordance with a further embodiment of the present invention. Included in network 200 are the first tier 110 of local mobile networks 112A–F, the second tier 120, of LECs 122A–F and the third tier of long distance networks 132A–F. Local mobile networks 112A–F no longer have local HLRs. Each local mobile network 112A–F, LEC 122A–F and LDS 132A–F is communicatively connected to a national mobile service platform 210. In addition, each local mobile network 112A–F is connected to signaling network 204 and each LDS 132A–F is connected to signaling network 202.

Figure 2C:
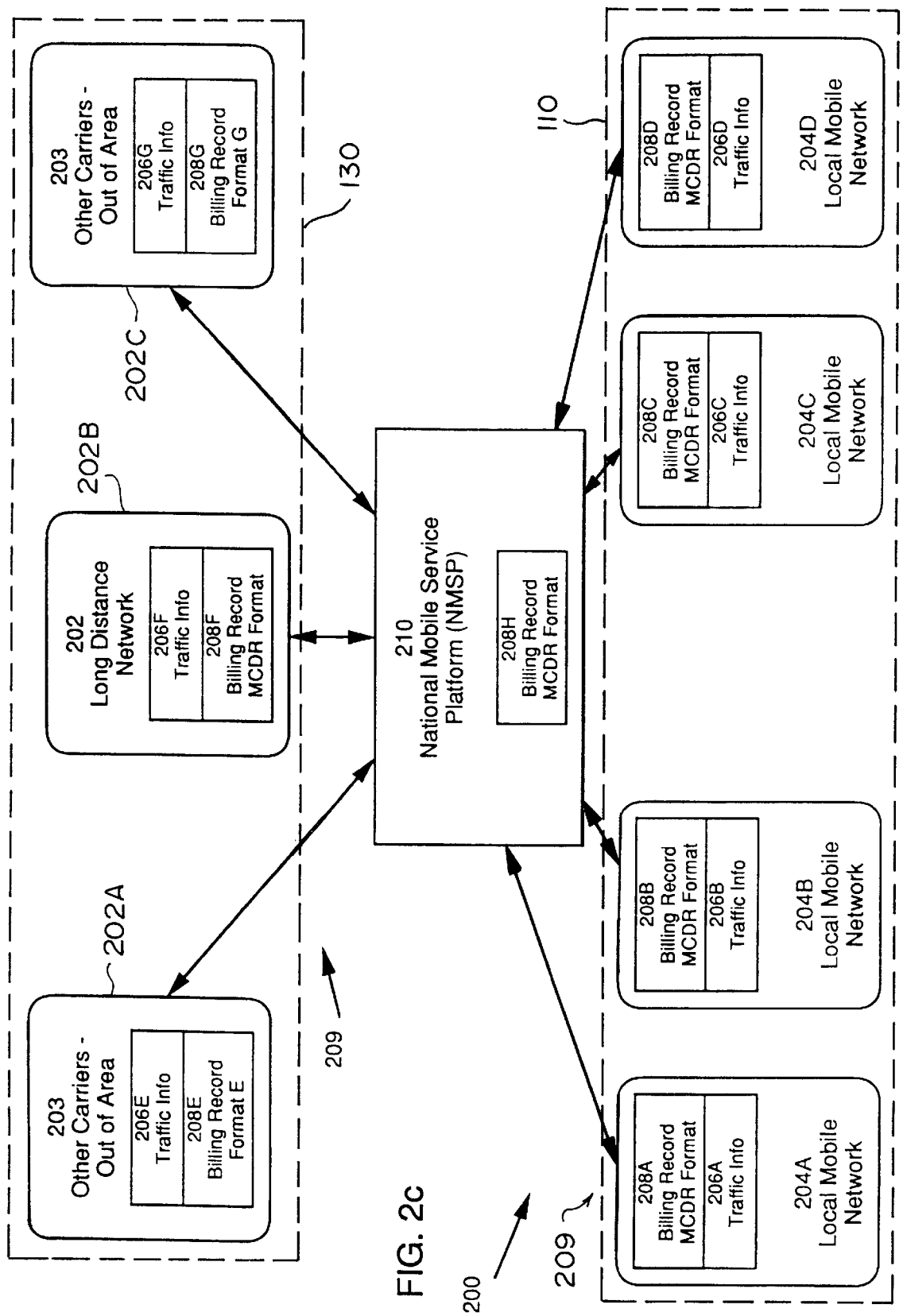
FIG. 2c is a diagrammatic representation of an exemplary flow of billing information which results from network 200.

FIG. 2c is an example of the flow of billing information which results from the embodiment of network 200 of FIG. 2b. For clarity, tier 120 has been omitted. Each LMN 204A–D generates billing records in a common master call detail record (MCDR) format. Each LMN 204A–D interchanges billing information only with NMSP 210. Likewise, each LDN 202A–C interchanges billing information only with NMSP 210. The NMSP 210 then processes the billing information and generates a single billing record, the master call detail record (MCDR) 208. The MCDR 208 is then communicated to the appropriate LMN, which then generates subscriber invoices. In this embodiment, the flow of data between networks is reduced, as is the need for all networks to intercommunicate billing information. As a result, the number of datastreams 209 is greatly reduced. This embodiment also has the advantages of the embodiment shown in FIG. 2a, in that the elimination of translation of billing records eliminates the overhead burden on each network due to translation.

Figure 2D:
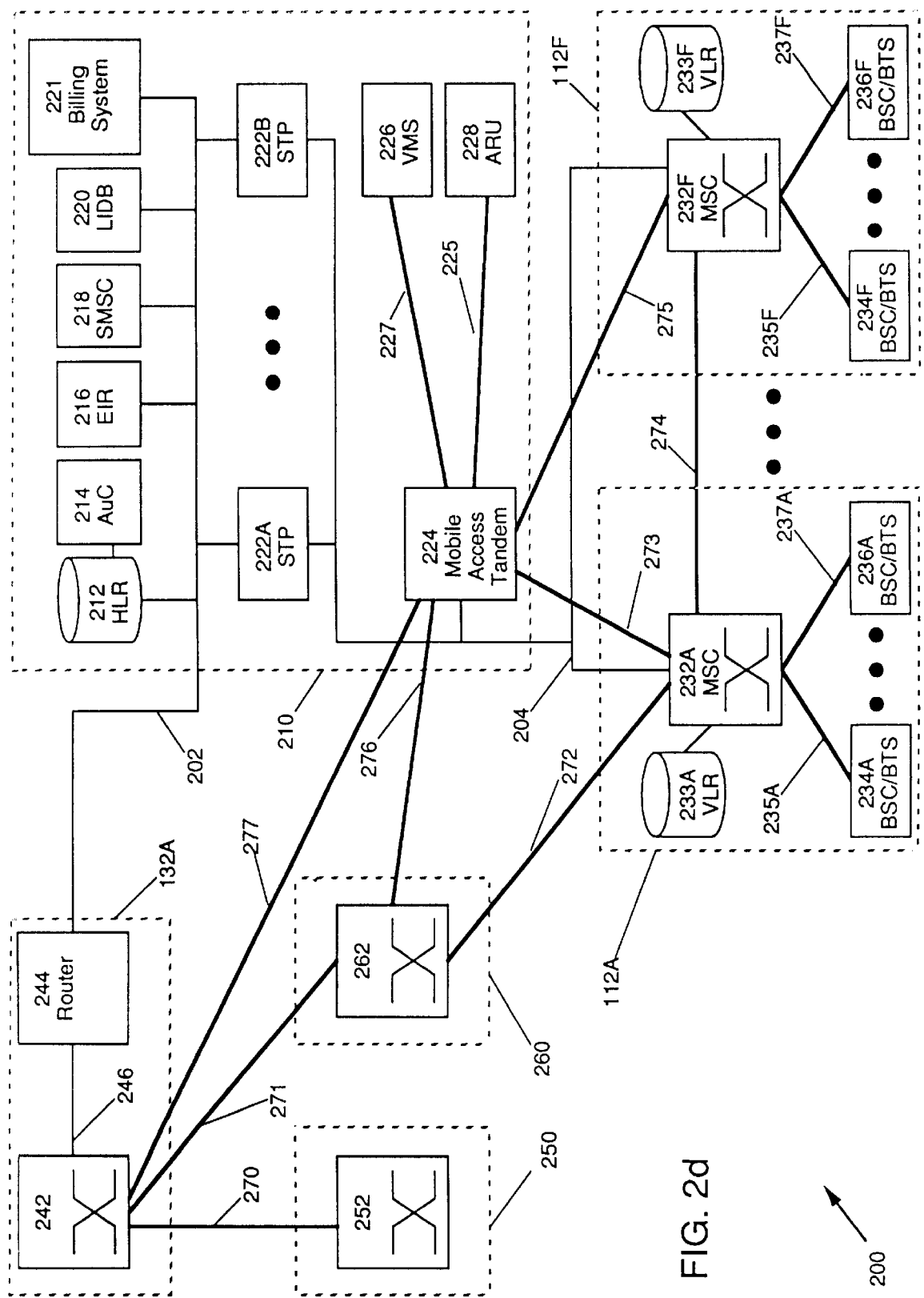
FIG. 2d is a block diagram of a nationwide mobile telecommunications network 200 showing the elements in more detail.

FIG. 2d is a block diagram of an exemplary nationwide mobile telecommunications network 200 showing the elements in more detail. Network 200 includes national mobile service platform (NMSP) 210, a plurality of local mobile networks (LMN) 112A–F, a long distance network 132A, and other carriers 250 and 260.

Local mobile networks 112A–F represent a plurality of local mobile networks coupled to NMSP 210. Each LMN 112A–F includes a plurality of the components shown. For example, LMN 112A includes mobile switching center (MSC) 232A, communicatively connected visitor location register 233A and a plurality of base station controllers (BSC)/base transceiver stations (BTS) 234A–F, 236A–F, which are connected to and controlled by MSC 232A via 235A–F, 237A–F respectively. The MSC 232A represents multiple MSCs, each of which has plural BSC/BTSs, which together make up LMN 112A. Each VLR may serve more than one MSC, but each MSC is associated with one VLR. Therefore, an MSC and its associated VLR are referred to as an MSC/VLR.

Each MSC/VLR in each LMN 112A–F is communicatively coupled to NMSP 210 over network intermachine trunks such as 272 273 274 275 and 276. These trunks may be negotiated by the carrier to carrier network operators. In addition, an LMN may be communicatively coupled with other LMNs and with NMSP 210 over signaling network 204. Signaling network 204 is a standard signaling network. In one embodiment, ANSI SS7 is used, but other embodiments may use other standard signaling networks, such as ITU CCS7 or X.25.

National mobile service platform 210 includes national home location register (HLR) 212, authentication center (AuC) 214, equipment integrity register (EIR) 216, short message service center (SMSC) 218, line information database (LIDB) server 220, billing system 221, a plurality of signal transfer points (STP) 222A–B, mobile access tandem 224, voice mail server (VMS) 226 and audio response unit (ARU) 228. The HLR 212, AuC 214, EIR 216, SMSC 218 and LIDB 220 are communicatively connected by signaling network 202. Signaling network 202 also communicatively connects a plurality of STPs 222A–B which interconnect signaling network 202 with signaling network 204. Signaling network 202 also communicatively connects long distance network 132A. The long distance network 132A includes network intelligence applications 242 and 244 interconnected by signaling interface 246. Signaling interface 246 may be embodied as a standard signaling interface such ANSI SS7 or an FDDI, ATM, or Ethernet connection supporting computer to computer communications. Intelligent applications such as 244 that are specific to a specialized service may be embodied as a stand-alone function, or may be integrated within a common set of intelligent applications such as 242. Instances where the specialized intelligent application 244 is not integrated within the common set of intelligent application 242, intelligent application 242 will initiate a remote trigger function toward intelligent application 244 to request the required information. In one embodiment, signaling network 202 uses ANSI SS7, but other embodiments may use other signaling networks, such as ITU CCS7 or TCAP over X.25, TCAP over TCP/IP.

Other carrier networks 250, 260 may comprise network switching fabrics 252, 262 for the purpose of switching voice and/or data traffic. Carrier network switching fabrics can access or share intelligent applications by querying the target intelligent application via an applicable signaling interface 270, 271 and 277. These signaling interfaces may be embodied as a standard signaling interface such as ANSI SS7, ITU CCS7, X.25, Ethernet or ATM.

National HLR 212 contains the profile and mobility information for mobile subscribers. The profile information is used to determine how a subscriber's calls are to be processed. The mobility information is used to route calls to the mobile station. The presence of national HLR 212 in NMSP 210 and intercommunications between NMSP 210 and LMNs 112A–F eliminates the need for the LMNs to have their own local HLRs. In one embodiment, there will be three separate national HLRs 212 at three separate sites to insure geographical diversity in the event of an environmental failure at a given site. The subscriber database will be replicated on each HLR, but each HLR will be the primary source for one third of the subscribers. This has the added advantage of reducing the message traffic which must be handled by each HLR.

Billing system 221 is the subsystem of NMSP 210 which receives the MCDRs transmitted from LMNs 112A–F and receives foreign CDRs from other networks. Billing system 221 translates the foreign CDRs to MCDRs and rates and bills all MCDRs in accordance with process 300, as shown in FIGS. 3a–e.

Authentication Center 214 stores the mobile subscriber data that allows the international mobile subscriber identity (IMSI) to be authenticated and the mobile path between the mobile station and the network to be ciphered. The AuC 214 transmits the data needed for authentication and ciphering via national HLR 212 to the MSC/VLR which is authenticating the particular mobile station. The subscriber authentication information, along with subscriber profile data, is stored on a subscriber identity module (SIM) which plugs into the mobile station. In one embodiment, AuC 214 resides on the same hardware platform as national HLR 212. In another embodiment, AuC 214 resides on a separate hardware platform communicatively coupled to at least national HLR 212.

Equipment integrity register 216 stores international mobile equipment identities (IMEI) for mobile equipment. There are three registers maintained by EIR 216. The white list includes the ranges of IMEIs allocated to type approved mobile equipment. The black list includes the IMEIs of equipment that is to be barred either because the equipment is stolen or is severely malfunctioning. The grey list includes IMEIs for faulty equipment whose malfunctioning is not severe enough for use to barred or for equipment which is suspected, but not confirmed, of being stolen.

Short message service center 218 stores short message, up to 160 characters, for mobile subscribers and delivers them to subscribers under the control of the short message gateway mobile service center. These messages generally contain status information related to voice mail messages. If the message cannot be delivered, national HLR 212 will be notified and the waiting short messages will be delivered when the subscriber becomes active on network 200. In addition, SMSC 218 supports the delivery of a voice mail waiting indicator which informs the subscriber through the SM-GMSC that their voice mail system has received a voice mail message.

Line information database 220 is a transaction oriented database system accessible via signaling networks 202 and 204. The LIDB 220 is optionally used during normal call processing, and is primarily used for operator-assisted calls. The LIDB 220 supports several functions including, originating line number screening, billed number screening, terminating line number screening and call intercept.

Voice mail server 226 provides mobile subscribers with non-volatile storage of voice messages. The VMS 226 is communicatively connected to MSC/VLRs 112A–F over trunks 227, 273 and 275. These trunks are typically T1 lines.

Figure 2E:
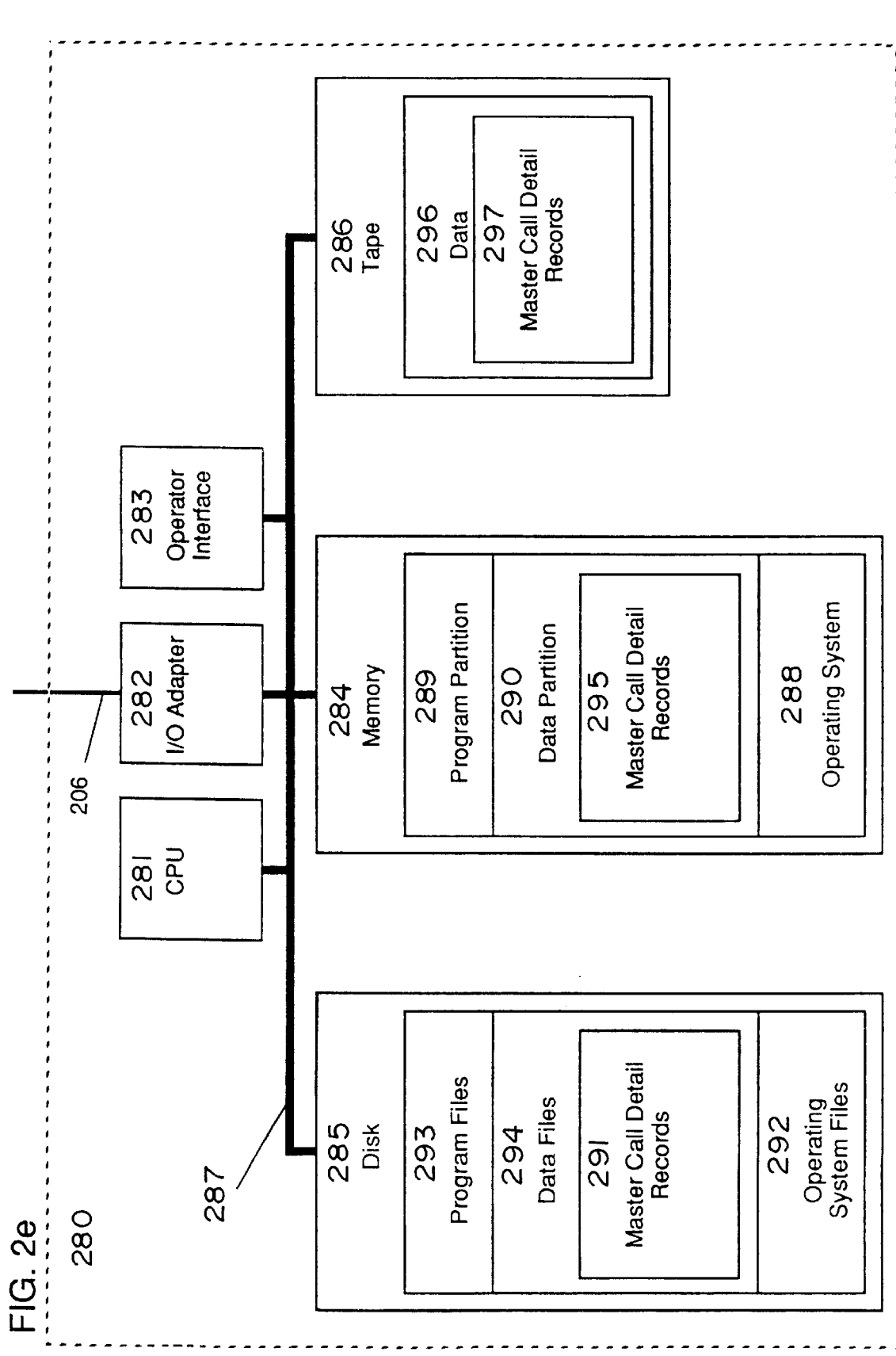
FIG. 2e is an exemplary block diagram of a database server 250 of FIG. 2d, which is representative of national HLR 212, AuC 214, EIR 216, SMSC 218 and LIDB 220.

FIG. 2e is an exemplary block diagram of a computer system 280 which is representative of billing system 221, national HLR 212, AuC 214, EIR 216, SMSC 218 and LIDB 220 of FIG. 2d above and billing system 104-2 of FIG. 2f below. Each of these blocks each comprise at least one such computer system. Although only one each of billing system 221, national HLR 212, AuC 214, EIR 216, SMSC 218 and LIDB 220 are shown in FIG. 2d, and only one billing system 104-2 is shown in FIG. 2f, it is well known in the art that a distributed architecture in which more than one computer system performs each function is entirely equivalent. System 280 includes a CPU 281, for executing program instructions and processing data and at least one I/O adapter 282, for communicating with other devices and transferring data in and out of the computer system, for example, over network 206. System 280 may include an operator interface 283, for providing status information to and accepting commands from a system operator. System 280 includes memory 284, for storing program instructions executed by and data processed by CPU 281. System 280 may also include mass storage devices, such as disk storage 285 or tape drive 286, for storing data transferred to and from memory. Other mass storage devices, such as optical disks, etc., may also be used and are equivalent. All these elements are interconnected by bus 287, which allows data to be intercommunicated between the elements.

Memory 284 is accessible to CPU 281 over bus 287 and includes operating system 288, program partition 289 and data partition 290. With reference in particular to billing systems 221 and 104-2, program partition 289 contains program instructions which are executed by CPU 281 to implement the respective portions of process 300, shown in FIGS. 3a–e, performed by billing systems 221 and 104-2. Data partition 290 includes data, such as MCDRs 291 which are processed by CPU 281. Disk 285 may contain operating system files 292, program files 293 and data files 294. Program files 293 contain program instructions implementing the processes of the invention which are transferred to memory 284 for execution by CPU 281. Data files 294 contain data, such as MCDRs 295, which are transferred to memory 284 for processing by CPU 281 or from memory 284 after processing by CPU 281. Tape drive 286 contains data 296, which include MCDRs 297, which are transferred to memory 284 for processing by CPU 281 or from memory 284 after processing by CPU 281.

FIG. 2f is a block diagram of a local mobile network 104. Shown are the switching network, which includes mobile switching centers, visitor location registers, etc., and billing system 104-2, which is a computer system similar to computer system 280. Switching network 104-1 generates traffic events, which are transmitted to billing system 104-2 over communications link 104-3. Billing system 104-2 processes the traffic events and generates MCDRs. The MCDRs are transmitted to the appropriate destination. In one embodiment, the destination is other LMNs. In another embodiment, the destination is NMSP 210.

Figure 3A:
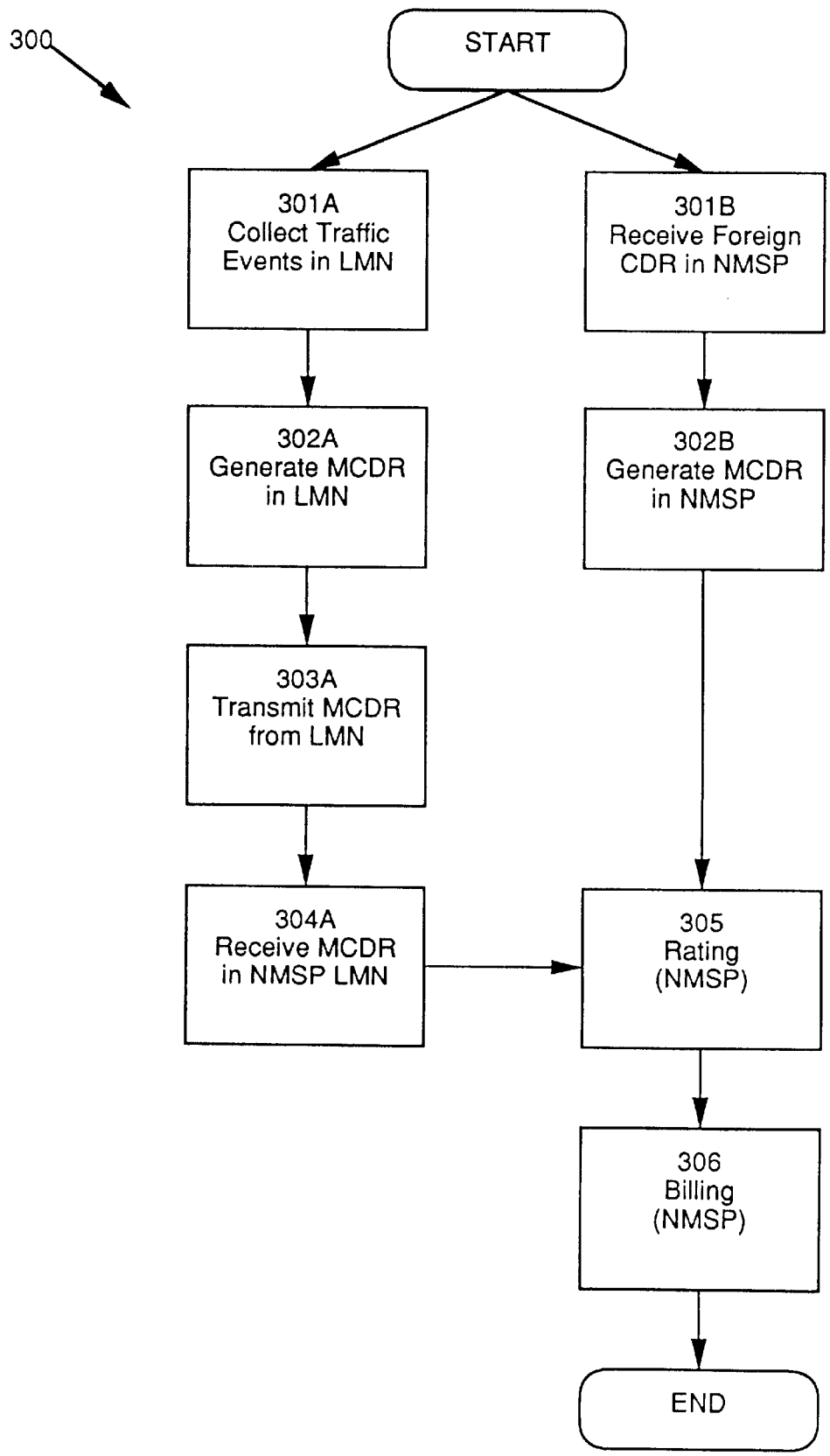
FIG. 3a is a flow diagram of billing process 300, implemented in network 200 incorporating an embodiment of the present invention shown in FIG. 2b.

FIG. 3a is a flow diagram of billing process 300 incorporating the present invention, which is implemented in telecommunications network 200. The process begins in step 301A, in which traffic events generated by a LMNs are collected by that LMN. In step 302A, the LMN generates a MCDR from the collected traffic events. In step 303A, the LMN transmits the MCDR to NMSP 210. In step 304A, NMSP 210 receives the transmitted MCDR. Alternatively, the process begins in step 301B, in which NMSP 210 receives foreign format call detail records (foreign CDRs) generated by and transmitted from other carrier networks. In step 302B, NMSP translates the received foreign CDRs and generates MCDRs from them.

In step 305, the MCDRs are rated to create unbilled rated usage. In step 306, the unbilled rated usage is billed.

Figure 3B:
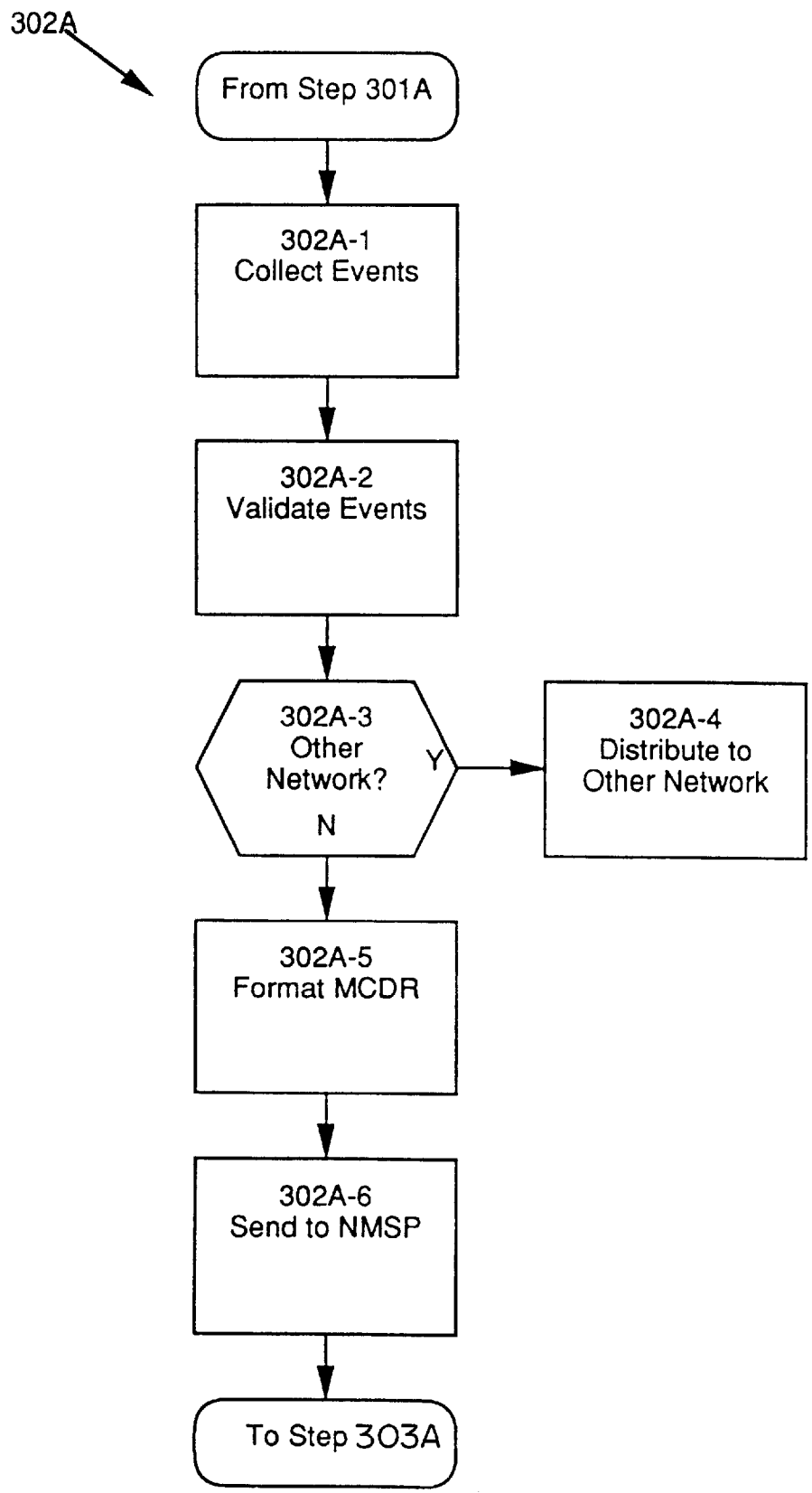

FIG. 3b is a flow diagram of the subprocess of step 302A of FIG. 3a. It begins with step 302A-1, in which call traffic events are received at a LMN. In step 302A-2, the received events are validated to detect and prevent fraud related to mobile usage. In step 302A-3, those events which are to be rated and billed by other networks are identified. In step 302A-4, those events which are to be rated and billed by other networks are distributed to the appropriate networks.

In step 302A-5, events are formatted into master call detail records (MCDR). In step 302A-6, the CDRs are sent to NMSP 210 for rating in step 303A.

Figure 3C:
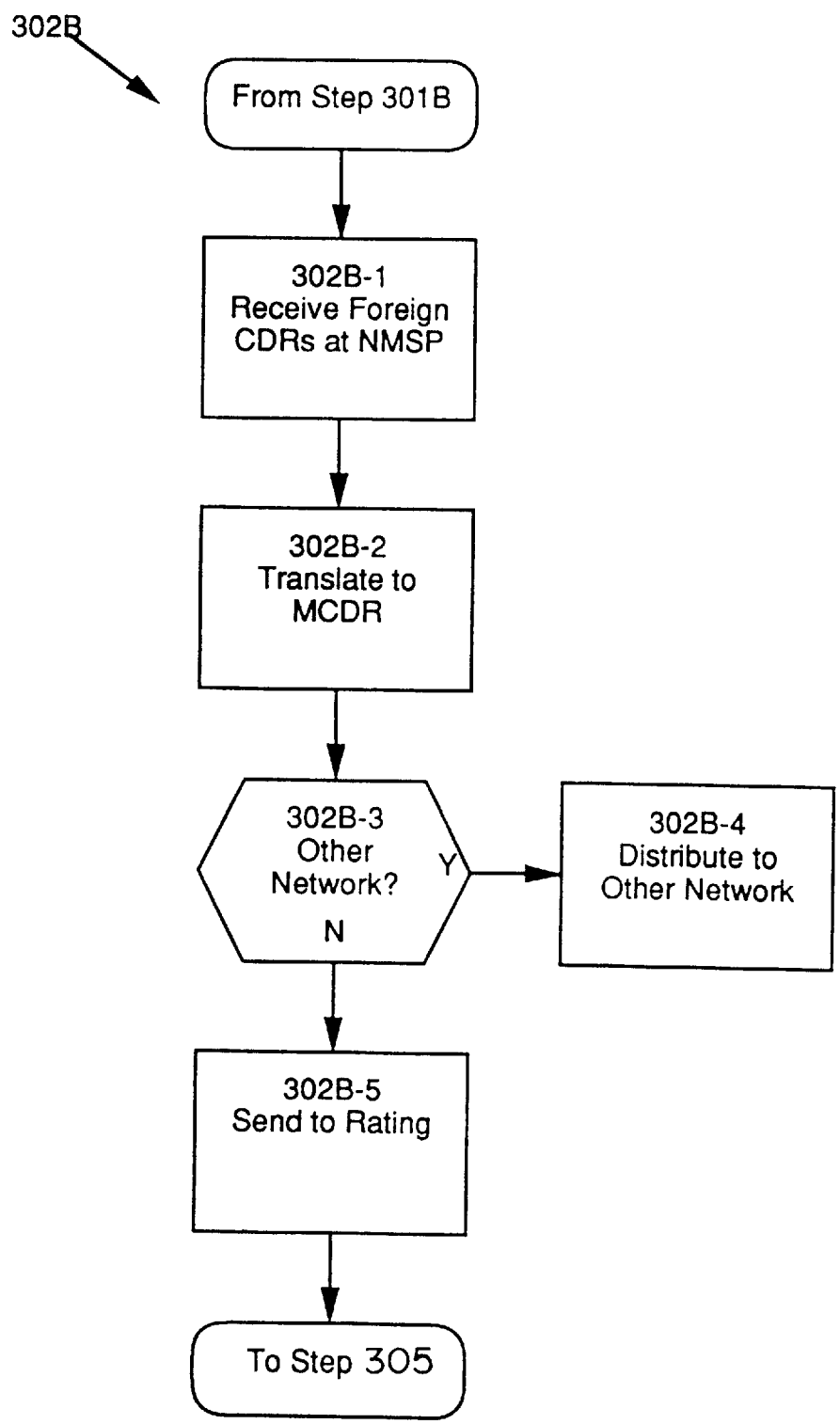

FIG. 3c is a flow diagram of the subprocess of step 302B of FIG. 3a. It begins with step 302B-1, in which NMSP 210 receives foreign format CDRs from other carrier networks. In step 302B-2, NMSP 210 translates the foreign format CDRs into MCDR format. In step 302B-3, NMSP 210 identifies those MCDRs which are to be rated and billed by other networks. In step 302B-4, those MCDRs which are to be rated and billed by other networks are distributed to the appropriate networks. In step 302B-5, the MCDRs which are to be processed by NMSP 210 are sent to rating subprocess, step 305.

Figure 3D:
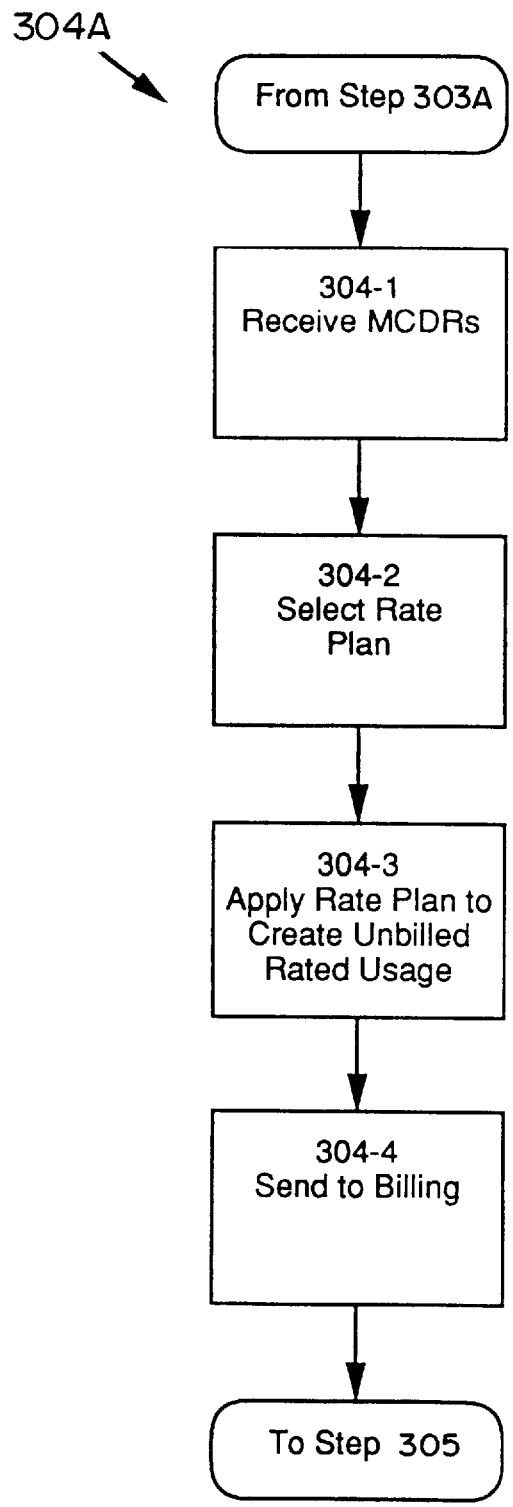

FIG. 3d is a flow diagram of the subprocess of step 304A of FIG. 3a. It begins with step 304-1, in which the CDRs are received. In step 304-2, the appropriate rate plan is selected based on information in the MCDR and on information in the customer database. Such information includes the rate plans to which the customer subscribes, promotions for which the customer is eligible, special calling plans such as calling/called party paid, etc. In step 304-3, the selected rate plan is applied to create unbilled rated usage. In step 304-4, the unbilled rated usage is sent to billing in step 305.

Figure 3E:
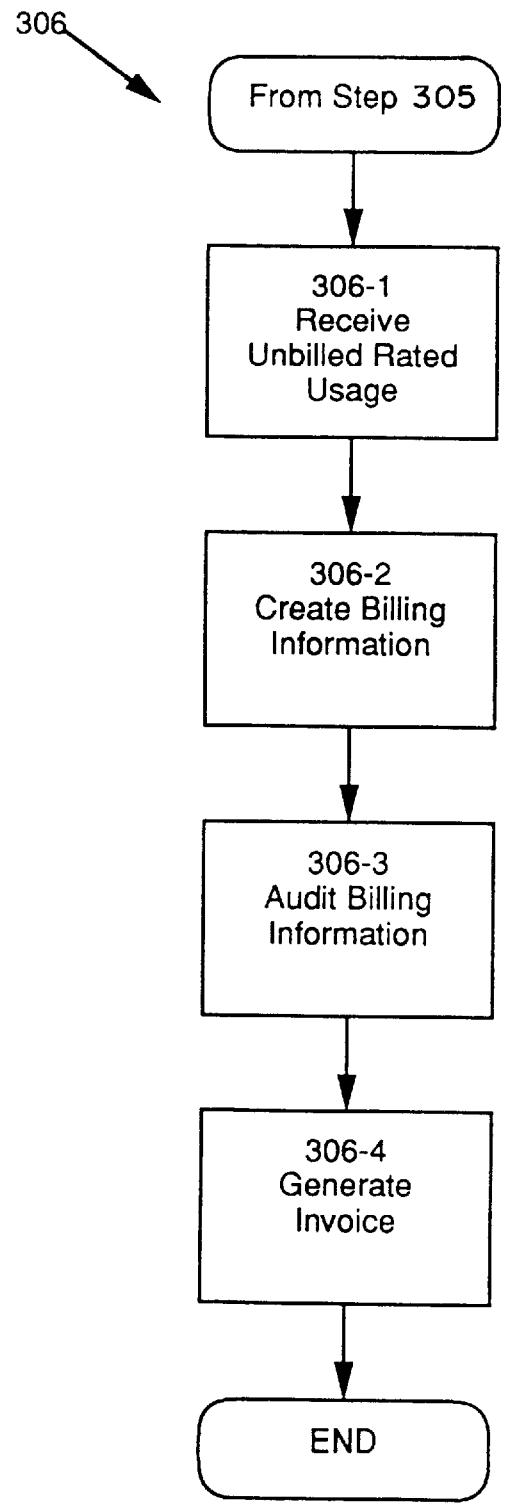

FIG. 3e is a flow diagram of the subprocess of step 306 of FIG. 3a. It begins with step 306-1, in which the unbilled rated usage is received. In step 306-2, billing information is created from the unbilled rated usage. This includes applying volume discounts for customers with cumulative rate plans, calculation and application of appropriate taxes, other discounts and promotions, equipment charges, late fees and payments made by the customer. In step 306-3, the billing information is audited and approved to ensure proper processing of unbilled rated usage. It is verified that the total of usage charges in the billing information equals the total of unbilled rate usage adjusted for discounts, promotions, volume rating, etc. In step 306-4, customer invoices are generated from the audited billing information. This step includes printing and mailing invoices, creating bill images for use by customer service, providing central accounting with information and updating customer information.

Figure 3F:
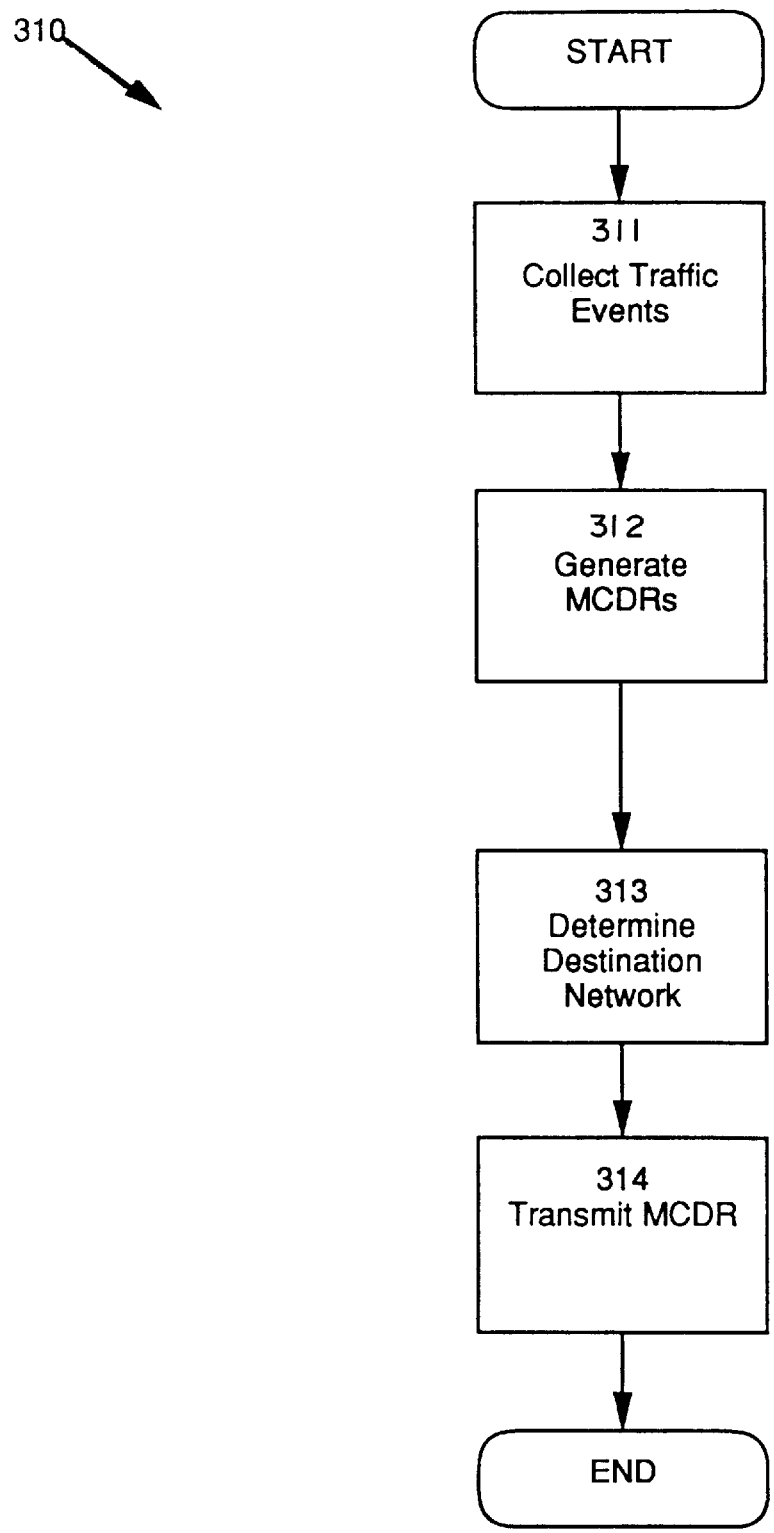

FIG. 3f is a flow diagram of billing process 310 incorporating the present invention, which is implemented in telecommunications network 100. The process begins in step 311, in which a traffic events generated by a LMN are collected by that LMN. In step 312, the LMN generates a MCDR from the collected traffic events. In step 313, the LMN determines the destination network for the MCDR and, in step 314, the LMN transmits the MCDR to the destination network.

Figure 4:
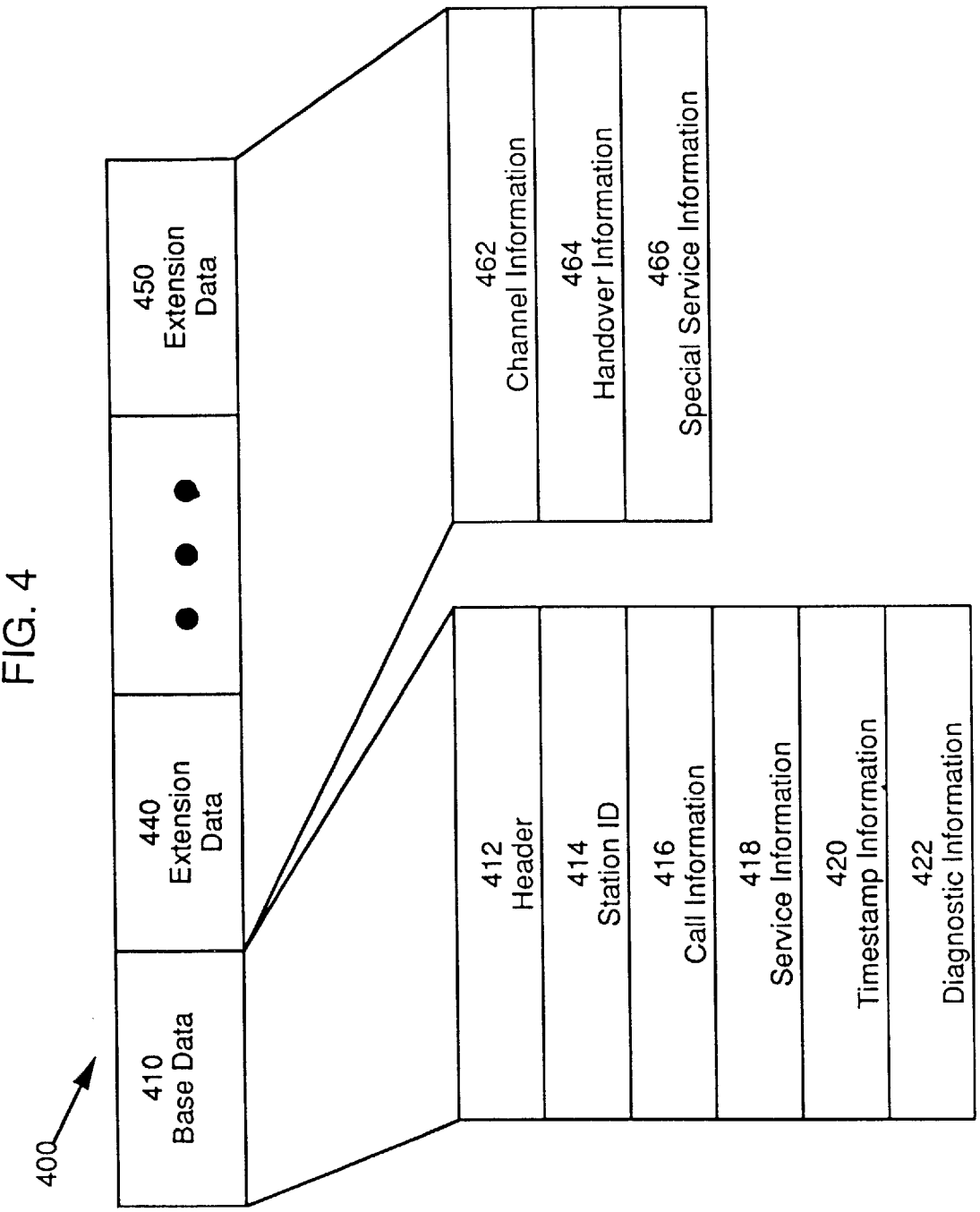
FIG. 4 is a format of a master call detail record (MCDR) 400.

FIG. 4 is a format of a master call detail record (MCDR) 400 which is contained in a memory or a mass storage device of system 280. The MCDR 400 includes base data block 410 and may optionally include one or more extension data blocks 440 to 450. Base data block 410 includes header 412, station ID 414, call information 416, service information 418, timestamp information 420, diagnostic information 422. Header 412 incudes the record type field, which indicates the type of event which cause the MCDR to be generated. Station ID 414 includes information which identifies the served mobile station, such as the IMSI and IMEI of the served mobile station. Call information 416 includes information relating to the originator and destination of the call, such as the calling number, the called number, identification of the originating carrier, any special dialing prefixes and the geographic number to which the call is ultimately connected. Service information 418 includes information about the services used to handle the call, such as the trunk group types and other services which may be applied. Timestamp information 420 includes timestamp information which allows the duration of the call to be determined. Diagnostic information 422 includes termination, reference and sequencing information.

Each extension data block includes either channel information 462, handover information 464, or special service information 466. Channel information 462 includes optional information about the mobile radio channels used for the call. Handover information 464 includes information about any handovers which occurred during the call. Special service information 466 includes information about any special service used during the call.

MCDR 400 is shown in more detail in Table 1.

TABLE 1

| FIELD NAME | | BASE OR OPTION | DESCRIPTION/COMMENTS |
| --- | --- | --- | --- |
| Header | Record Type | Base | Indicates the type of event which caused MCDR to be generated. For example: Mobile Call Terminating/Originating Call 911 Call |
| Station ID | Served IMSI | Base | International Mobile Subscriber Identification of served subscriber |
| | Served IMEI | Base | International Mobile Equipment Identification of served equipment |
| | Served MSISDN | Base | |
| Call Routing Information | Calling Number | Base | Telephone number of the originator of the call-15 Digits |
| | Called Number | Base | Telephone number dialed by the originator of the call-15 Digits |
| | CIC Code | Base | Carrier Identification Code of the carrier of the originator of the call- 4 Digits |
| | Prefix Digits | Base | Dialed Prefix Information- 4 hex digits recorded: 0000-(null) Not used 0001-0+ |

TABLE 1-continued

| FIELD NAME | BASE OR OPTION | DESCRIPTION/COMMENTS |
|---|---|---|
| | | 0010-1+ |
| | | 0011-01+ |
| | | 0100-011+ |
| | | 0101-0- |
| | | 0110 to 000F-Not Used (future expansion) |
| | | May also include other numbering plans as specified by GSM. |
| Translated Number | Base | Geographic telephone number translated from called number when called number is a special service number such as 800, 900 or V-net. Translated within the MSC. |
| Roaming Number | Base | Telephone number of mobile station if station is roaming outside its home area. Used to route the call to the mobile station, if applicable. |
| Connected Number | Base | Telephone number of the connected station, if different than the called number. |
| Recording Entity | Base | The number of the visited MSC. |
| Incoming Trunk Group | Base | Trunk group on which the inbound call is originated. |
| Outgoing Trunk Group | Base | Trunk group on which outbound call is sent. |
| Location | Base | Identifies the location and change of location (to be time stamped) of the mobile station. May include: MSC identification MSC trunk group Location area identification Call identification Channels used: Channel type Channel number |
| Change of Location | Base | A list of changes in location area code and cell identification, each one time stamped. |

| | | | |
|---|---|---|---|
| Service Information | Basic Service | Base | Basic level of service to which subscriber subscribes. Bearer or teleservice employed. The starting time of these services will be time stamped. |
| | Transparency Indicator | Base | Provided only for those teleservices which may be employed in both transparent and non-transparent modes. |
| | Change of Service | Base | A list of changes of basic service during a connection, each time stamped. Used to prorate charges for service |
| | Supplementary Services | Base | Services used which are not included in basic service which are invoked as a result of this connection. |
| | AOC Parameters | Base | Advice of Charge service parameters-Advice of Charge service advises subscriber of basic rates for each call. Parameters control how this service is performed. Sent to mobile station on call setup. |
| | Change of AOC Parameters | Base | New AOC parameters sent to the mobile station, e.g. as a result of a tariff changed, including the time at which the new set of parameters was applied. |
| | MS Classmark | Base | The mobile station employed on call setup. |
| | Change of Classmark | Base | A list of changes to the classmark during the connection, each time stamped. |
| Timestamp Information | Event Time Stamp-Incoming Traffic Channel | Base | Time at which seizure of incoming traffic channel occurred (for unsuccessful call attempts) |

TABLE 1-continued

| | FIELD NAME | BASE OR OPTION | DESCRIPTION/COMMENTS |
|---|---|---|---|
| | Seizure Event Time Stamp-Outgoing Traffic Channel Seizure | Base | Time at which seizure of outgoing traffic channel occurred (for unsuccessful call attempts) |
| | Event Time Stamp-Answer (successful call) | Base | Time at which successful call was answered. |
| | Event Time Stamp-Release of Traffic Channel | Base | Time at which traffic channel was released. |
| Channel Information | Radio Channel Requested | Extension | The type of radio channel, full or half rate, requested by the mobile station. |
| | Radio Channel Used | Extension | The type of radio channel, full or half rate, actually used. |
| | Change of Radio Channel | Extension | A list of changes in the radio channel, each time stamped. |
| | Incoming Radio Channel Used | Extension | Used for radio to radio calls |
| | Outgoing Radio Channel Used | Extension | Used for radio to radio calls |
| Diagnostic Information | Cause for Termination | Base | Reason call was disconnected, such as loss of signal, system malfunction, etc. |
| | Diagnostics | Base | Details regarding cause for termination |
| Reference Information | Data Volume | Base | The number of data segments transmitted, if available at the MSC. |
| | Sequence Number | Base | Partial record sequence number, present only for partial records. |
| | Call Reference | Base | A local identifier distinguishing between transactions at the same mobile station. |
| | Record Extensions | Base | A set of network/manufacturer specific extensions to the record. |
| Handover Information | Handover Number | Extension | The same as the Roaming Number. |
| | Handover MSC Number | Extension | MSC to which call was handed over during roaming |
| | Handover MSC Trunk Number | Extension | Trunk to which MSC to which call was handed over is connected, during roaming from one MSC to another. |
| Special Service Information | SS Action | Extension | Special Service used during call. |
| | SS Action Time Stamp | Extension | Time Special Service was initiated. |
| | SS Parameters | Extension | Parameters which were used to perform Special Service |
| | SS Action result | Extension | Result of Special Service |
| | Caller/Subscriber Paid | Base | Indicates who is to be billed for the call, the caller or the subscriber. Default is subscriber paid |
| | V & H Coordinates | Extension | Vertical and Horizontal grid coordinates for North America-two two byte fields |
| | Manual Call Trace (MCT) | Extension | An indicator for manual request of call trace. Initiated by the called party dialing *57 after the call is completed. |

Although specific embodiments of the present invention have been disclosed, it will be seen by those of skill in the art that other equivalent embodiments are possible.

What is claimed is:

1. A mobile telecommunications network billing system comprising:

a processor;

a memory coupled to and accessible by the processor, comprising at least one master call detail record, the master call detail record comprising:

information identifying a mobile station and a mobile subscriber;

information relating to a routing of a mobile call;

information relating to a service level of the mobile subscriber;

information relating to a timing of the mobile call; and information relating to the reasons for termination of the mobile call.

2. The system of claim 1, wherein the information relating to the routing of the mobile call comprises at least one of:

an indicator of a calling number; an indicator of a called number, an indicator of a carrier identification code; an indicator of a prefix digit; an indicator of a translated number; an indicator of a roaming number; an indicator of a connected number; an indicator of a recording entity; an incoming trunk group; an outgoing trunk group; an indicator of a location; and an indicator of a change of location.

3. The system of claim 1, wherein the information relating to the service level of the mobile subscriber comprises at least one of:

an indicator of a basic service; an indicator of a transparency indicator; an indicator of a change of service; an indicator of a supplementary service; an indicator of an advice of change parameter; an indicator of a change of advice of change parameter; an indicator of a mobile service classmark; and an indicator of a change of mobile service classmark.

4. The system of claim 1, wherein the information relating to the timing of the mobile call comprises at least one of:

an indicator of a time at which an incoming traffic channel is seized; an indicator of a time at which an outgoing traffic channel is seized; an indicator of a time at which a call is answered; and an indicator of a time at which a traffic channel is released.

5. The system of claim 1, wherein:

the information relating to the routing of the mobile call comprises at least one of:

an indicator of a calling number; an indicator of a called number; an indicator of a carrier identification code; an indicator of a prefix digit; an indicator of a translated number; an indicator of a roaming number; an indicator of a connected number; an indicator of a recording entity; an incoming trunk group; an outgoing trunk group; an indicator of a location; and an indicator of a change of location;

the information relating to the service level of the mobile subscriber comprises at least one of:

an indicator of a basic service; an indicator of a transparency indicator; an indicator of a change of service; an indicator of a supplementary service; an indicator of an advice of change parameter; an indicator of a change of advice of change parameter; an indicator of a mobile service classmark; and an indicator of a change of mobile service classmark;

the information relating to the timing of the mobile call comprises at least one of:

an indicator of a time at which an incoming traffic channel is seized; an indicator of a time at which an outgoing traffic channel is seized; an indicator of a time at which a call is answered; and an indicator of a time at which a traffic channel is released.

6. The system of claim 5, wherein the master call detail record further comprises:

information relating to a handover of the mobile call;
information relating to a special service used during the mobile call; and
information relating to a mobile radio channel used during the mobile call.

7. The system of claim 1, wherein the master call detail record further comprises:

information relating to a handover of the mobile call.

8. The system of claim 1, wherein the master call detail record further comprises:

information relating to a special service used during the mobile call.

9. The system of claim 1, wherein the master call detail record further comprises:

information relating to a mobile radio channel used during the mobile call.

10. The system of claim 1, wherein the master call detail record further comprises:

information relating to a handover of the mobile call;
information relating to a special service used during the mobile call; and
information relating to a mobile radio channel used during the mobile call.

11. A mobile telecommunications network billing system comprising:

a plurality of local mobile telecommunications networks, each network generating a master call detail record;
a data network interconnecting each local mobile telecommunications network and intercommunicating master call detail records.

12. The system of claim 11, wherein each local mobile telecommunications network comprises:

an information collection device collecting call traffic information;
an information formatter formatting the collected call traffic information into a master call detail record;
a routing device determining the telecommunications network to which the master call detail record is to be transmitted; and
a transmitter transmitting the master call detail record over the data network.

13. The system of claim 12, wherein the master call detail record comprises:

information identifying a mobile station and a mobile subscriber;
information relating to a routing of a mobile call;
information relating to a service level of the mobile subscriber;
information relating to a timing of the mobile call; and
information relating to the reasons for termination of the mobile call.

14. The system of claim 13, wherein the master call detail record further comprises:

information relating to a handover of the mobile call;
information relating to a special service used during the mobile call; and
information relating to a mobile radio channel used during the mobile call.

15. The system of claim 11, wherein the master call detail record comprises:

information identifying a mobile station and a mobile subscriber;
information relating to a routing of a mobile call;
information relating to a service level of the mobile subscriber;
information relating to a timing of the mobile call; and
information relating to the reasons for termination of the mobile call.

16. The system of claim 15, wherein the master call detail record further comprises:

information relating to a handover of the mobile call;

information relating to a special service used during the mobile call; and information relating to a mobile radio channel used during the mobile call.

17. A mobile telecommunications network billing system comprising:

a plurality of local mobile telecommunications networks, each network generating and transmitting a plurality of master call detail records;

a national mobile service platform communicatively connected with each local mobile telecommunications network, receiving the plurality of master call detail records.

18. The system of claim 17, wherein each local mobile telecommunications network comprises:

an information collection device collecting call traffic information;

an information formatter formatting the collected call traffic information into a master call detail record; and a transmitter transmitting the master call detail record.

19. The system of claim 17, wherein the national mobile service platform comprises:

a receiver receiving the master call detail record;

a rating device rating the master call detail record to generate unbilled rated usage; and a billing device billing the unbilled rated usage to generate billed usage.

20. The system of claim 17, wherein:

each local mobile telecommunications network comprises:

an information collection device collecting call traffic information, an information formatter formatting the collected call traffic information into a master call detail record, and a transmitter transmitting the master call detail record; and the national mobile service platform comprises:

a receiver receiving the master call detail record, a rating device rating the master call detail record to generate unbilled rated usage, and a billing device billing the unbilled rated usage to generate billed usage.

21. The system of claim 20, wherein the master call detail record comprises:

information identifying a mobile station and a mobile subscriber;

information relating to a routing of a mobile call;

information relating to a service level of the mobile subscriber;

information relating to a timing of the mobile call; and information relating to the reasons for termination of the mobile call.

22. The system of claim 21, wherein the master call detail record further comprises:

information relating to a handover of the mobile call;

information relating to a special service used during the mobile call; and information relating to a mobile radio channel used during the mobile call.

23. The system of claim 17, wherein the master call detail record comprises:

information identifying a mobile station and a mobile subscriber;

information relating to a routing of a mobile call;

information relating to a service level of the mobile subscriber;

information relating to a timing of the mobile call; and information relating to the reasons for termination of the mobile call.

24. The system of claim 23, wherein the master call detail record further comprises:

information relating to a handover of the mobile call;

information relating to a special service used during the mobile call; and information relating to a mobile radio channel used during the mobile call.

25. A method for generating and communicating telecommunications billing data in a telecommunications network comprising at least one local mobile network, comprising the steps of:

collecting call traffic information at the local mobile network;

formatting the collected call traffic information into a master call detail record;

determining the telecommunications network to which the master call detail record is to be transmitted; and transmitting the master call detail record.

26. The method of claim 25, wherein the master call detail record comprises:

information identifying a mobile station and a mobile subscriber;

information relating to a routing of a mobile call;

information relating to a service level of the mobile subscriber;

information relating to a timing of the mobile call; and information relating to the reasons for termination of the mobile call.

27. The method of claim 26, wherein the master call detail record further comprises:

information relating to a handover of the mobile call;

information relating to a special service used during the mobile call; and information relating to a mobile radio channel used during the mobile call.

28. A method for generating and communicating telecommunications billing data in a telecommunications network comprising a national mobile service platform and at least one local mobile network, comprising the steps of:

collecting call traffic information at the local mobile network;

formatting the collected call traffic information into a master call detail record;

transmitting the master call detail record to the national mobile service platform;

receiving the transmitted master call detail record at the national mobile service platform;

rating the received master call detail record to generate unbilled rated usage; and billing the unbilled rated usage to generate billed usage.

29. The method of claim 28, further comprising the steps of:

before formatting the collected call information into a master call detail record, validating the collected call traffic events.

30. The method of claim 29, further comprising the steps of:

determining whether the validated call traffic information is destined for the national mobile service platform or for another network;

distributing the validated call traffic information to the another network, if another network is the determined destination; and formatting the collected call traffic information into a master call detail record, if the national mobile service platform is the determined destination.

31. The method of claim 30, wherein the master call detail record comprises:

information identifying a mobile station and a mobile subscriber;

information relating to a routing of a mobile call;

information relating to a service level of the mobile subscriber;

information relating to a timing of the mobile call; and information relating to the reasons for termination of the mobile call.

32. The method of claim 31, wherein the master call detail record further comprises:

information relating to a handover of the mobile call;

information relating to a special service used during the mobile call; and information relating to a mobile radio channel used during the mobile call.

* * * * *